April 18, 1950 B. P. DEL ROSARIO 2,504,814

LOCKOUT DEVICE FOR PARTY LINE TELEPHONES

Filed June 5, 1947

INVENTOR.

BERNARDO P. DEL ROSARIO

BY Victor J. Evans & Co.

ATTORNEYS

Patented Apr. 18, 1950 2,504,814

UNITED STATES PATENT OFFICE 2,504,814

LOCKOUT DEVICE FOR PARTY LINE TELEPHONES

Bernardo P. del Rosario, Lingayen, Pangasinan, P. I.

Application June 5, 1947, Serial No. 752,714

6 Claims. (Cl. 179—31)

My present invention relates to an improved lock-out device for party line telephones and is especially adapted for use in existing telephone circuits wherein two or more telephones operate from a party line circuit extending to a common battery central office.

In the present system if one party is using the line, the other party may interfere with such use by lifting the receiver thus avoiding privacy for either party, and in addition where dial systems are used if one party is dialing, lifting of the receiver by the other party will interefere with such dialing.

It is the purpose of my invention to provide circuits and means operable in the circuits so that if one line is in use sufficient current to energize the second line will not be available and therefore the first line in use will be completely private until the receiver is replaced on the switchhook to open the circuit.

In the accompanying drawings I have illustrated one complete example of the physical embodiment of my invention according to the best mode I have thus far devised, but it will be understood that various changes and alterations may be made in the exemplified structure within the scope of the appended claims.

Figures 1, 2:
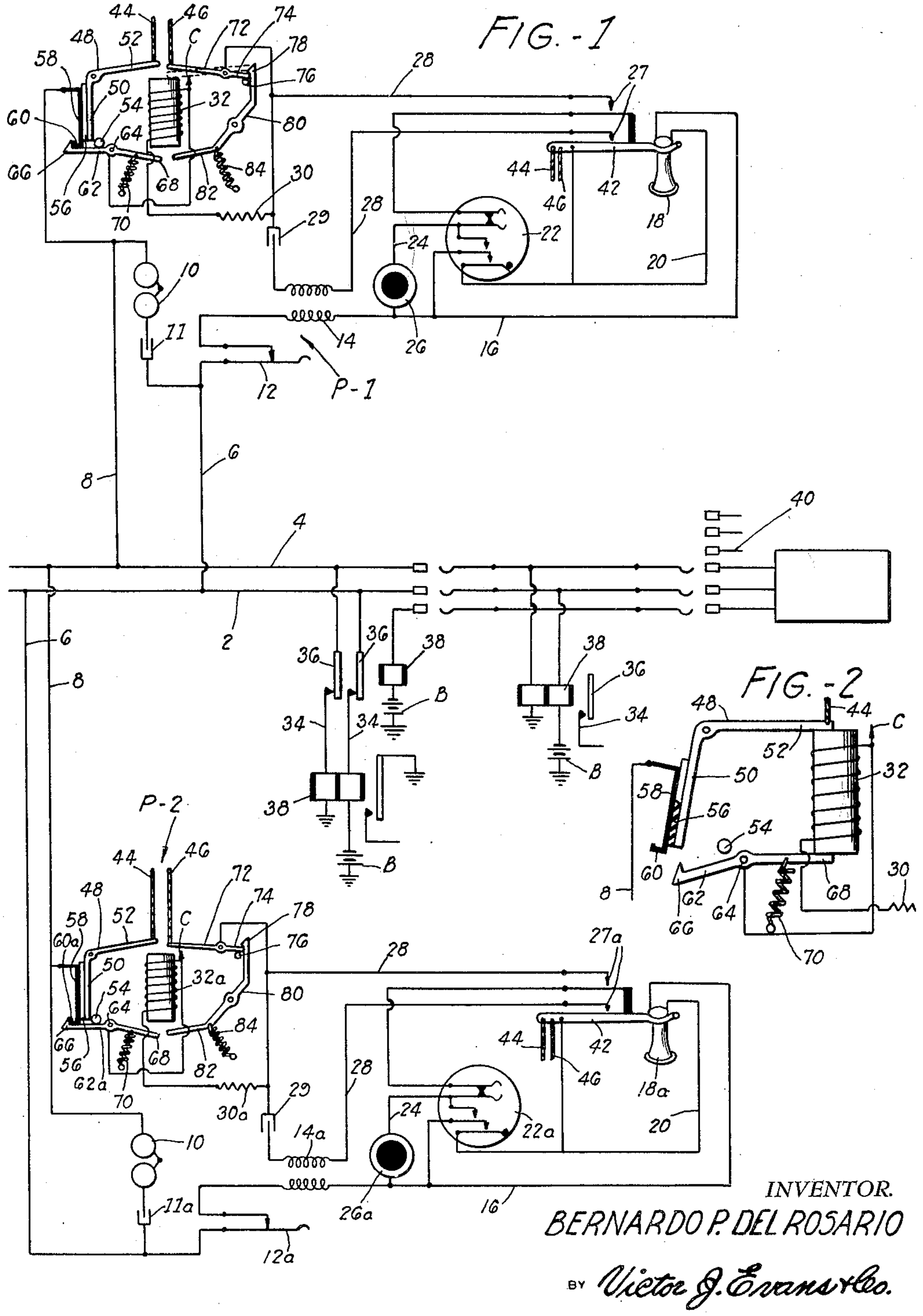
Fig. 1 is a diagrammatic view of the system of my invention showing the circuits therefor.
Fig. 2 is an enlarged detail view of an electromagnetic control for the circuits.

Referring now to the drawings illustrating the present preferred circuits of my invention I have shown the telephone line comprising wires 2 and 4 connected with a pair of party lines 6 and 8 and each party line circuit includes a telephone set having a common talking and dialing circuit and comprising the conventional units, together with ringer 10 in series across the wires 6 and 8, a condensor 11 and the armature 12.

The induction coil 14 is connected by wire 16 to the receiver 18 and thence by wire 20 to the impulse sender or dial 22. Wire 24 connects with the transmitter 26.

Contacts 27 in circuit 28 including condensor 29 connect with resistor 30 and the solenoid or electromagnet 32.

The exchange of conventional design comprises contacts 34 and 36, of relay 38, for the selecter switch 40, and current is supplied by batteries B.

In each party line, the receiver 18 is designed to be supported by the switch hook arm 42, and the short end of the fulcrumed arm is perforated to receive the latch restoring strings 44 and 46.

String 44 leads to and is connected to a lever or cut-off armature 48 having angular legs 50 and 52 the latter leg 52 being drawn by the electromagnet 32 to the position of Fig. 2, the leg 50 moving away from the stop 54. Insulation 56 separates the leg 52 from the plate 58 having a U-end 60 and this plate is connected with wire 8.

A latch bar or pressing armature 62 pivoted at 64 has a hook arm 66 engageable with the end 60 and an arm 68 subject to attraction by electromagnet 32 against spring 70.

String 46 connects the switch hook arm 42 with a lever or shortening armature 72 having a short arm 74 limited in movement by stop 76 and engageable by the hook 78 of a lever or locking armature 80 the other end 82 of which may be attracted by electromagnet 32 against the tension of spring 84.

The operation of the invention is as follows: First, assume that the party at station P—1 wishes to call another line in the exchange, and assume also that the party line 1 is idle at the time. When the calling subscriber removes his receiver from the switch hook a circuit is closed and current flows from the battery of the central office. From the party line 6 current flows through the key or switch 12 at station P—1, through induction coil 14, transmitter 26, normally closed dial contacts 22, switchhook contact 27, resistor 30, through the winding of electromagnet 32, cut off armature 60 locking and contact spring 54, and back to central office over the line 8 of the party line. At this instant magnet coil or solenoid 32 thus becomes energized, it attracts locking armature 82 first, an armature which is pivoted almost at the center, pulled by spring 84 on one side, and locks armature 74 at its tip. Upon the release of the lock at the tip of the shorting armature 74, it is instantly attracted. Locking armature 82 goes ahead of shorting armature 72 in a split second. The moment shorting armature is attracted the current flows from the switchhook to the shorting armature 72, to contact C, armature 62, spring plate 60 and back to the central office battery. Shorting armature 72 thus bridges out resistor 30 and magnet coil 32. Magnet coil 32 deenergizes causing lock armature 82 to spring back, locking again the same armature 72 on its return, making sure that their tips press against each other. The tip of the lock armature 72 is like a diagonal cut so that when pressed the shorting armature's tip is wedged tight to push the shorting armature against the contact C. This is the operating position until the receiver is replaced on the switchhook. The telephone set works as if nothing is inserted in the line. The switchhook pulls back the shorting armature 72 by the tied string, making the tip of armature 72 to snap past the tip of lock armature 82 which is diagonally cut.

The operation of the central office relays and batteries are of the well known type. The calling party now proceeds to operate his dial contacts 22 to set the selector switch 40 and succeeding switches to extend the connection through to the line of the desired subscriber.

A station that may intercede while another station is dialing at the same line will automatically disconnect that interceding station. That means to say that dialing of the prior station will continue unhampered. Without this device in the telephone set of subscriber cannot dial or call a desired station if the station of another subscriber is bridged across the line.

The party at station P—1 may carry on his conversation with the called subscriber free from any interruption from another party on the line 1 and also with assurance that no other party on the line can listen to the conversation. Should another party on the line 1 such as the party at station P—2, remove his receiver from the switchhook while the line is engaged by the station P—1, the bridge at station P—2 is closed through the switch 12a, induction 14a, transmitter 26a, dial spring 22a, switchhook contact 27a, resistor 30a, relay coil 32a, cut off armature 52a, and lock spring 60a, in the manner already described in connection with station P—1. However the resistor 30a, relay coil 32a, are serially connected and the very weak current or potential applied thereto is not sufficient to energize the relay and attract armature 72 and 82 as a considerable portion of the available current from the party line is already diverted to station P—1. Thereby all the armatures are stuck when the string's pull is loosened. The full resistance of the relay coil which is like the resistance of the field coil of radio receiver speaker plus the 3000 ohms resistor are connected serially with the talking sets. Accordingly insufficient current flows through the bridge at station P—2 either to energize the transmitter or to allow audible current to pass through the receiver 18a. The party at station P—2, therefore, is effectively excluded from the line 1 during its use by station P—1. When the parties have finished their conversation, the subscriber at station P—1 replaces his receiver 18 on the switchhook 42, opening the switchhook contacts, pulling back the armatures by strings tied to switchhook and tied to armatures. The opening of the line also causes the usual release of the automatic switches in the central office.

Recollecting what was explained when station P—1 has seized the party line when idle. Its shorting armature has eliminated its resistor and relay coil making the bridge from the central office battery short circuited only by the talking set as usual as if nothing was inserted in the line, such that the full battery potential energizes the talking set. Now a second station on the same line such as P—2 desires to make a call such that he will use the same party line. As usual he lifts his receiver from the switchhook and usually people never ascertain whether the party line is busy or not. They proceed at once to dial the number of the desired station then put their receiver piece near their ear. It was found that the pulsating current created by dail springs can attract the shorting armature, although weak current flows across the resistor and relay coil. Dialing therefore on station P—2 will pull down the shorting armature 72a which was not attracted by the undisturbed weak current. If there is no cut off armature as a remedy to cut off the interfering station from the line this will happen. Station P—1 will be disturbed by station P—2, by rotating the dial.

Adjusting two armatures, one nearer the core than the other as shown the nearer armature 82 will be attracted with the full battery potential applied across the relay coil and resistor. This is the operating condition. When the farther armature as well as the nearer armature stay unattracted it shows that this station is the interfering station and another station has gotten control of the line. But when the two armatures are attracted in an interfering station, it shows that the dial is rotated. This farther armature is the cut off armature—armature 52 in stations P—1 and P—2. The nearer armature is the shorting or magnet excluding armature—armature 72 in stations P—1 and P—2.

In station P—2, 52 is the cut off armature and the return pass back to party line which shows therefore that station P—2 will cut itself from the line if its dial is rotated when station P—1 is on the line.

Spring plate 60 is the contact and lock for cut off armature 52. It normally presses on the latching tip 66 of armature 62 and serves as the return path back to line 4.

In station P—1, the assumed station in our description which took hold of the line, the effect of the pulsating dial here is neutralized because shorting armature 72 has deenergized its electromagnet 32 and has cut it out of the circuit. Therefore at a station which controls the line its cut off armature is never affected by the dial. Whereas in an interfering station there is not a single armature attracted unless the dial is rotated. The dial then causes all of the armatures in an interfering station to be attracted simultaneously.

During operation sometimes the telephone set is accidentally jerked, bumped, or jarred subjecting the parts especially the armatures to receive mechanical vibrations and this may cause the armatures to fall even if not attracted electrically. The remedy is given by the addition of the pressing armatures 62 which are provided with hooks 66 at their tip giving a firmer hold or fix adjustment with regards to the distance of armature from core, and making the pull from attraction when it comes, to have no opposition from this hook because they open up.

The most important work of the hook 78 is to prevent the shorting armature 72 from falling simply from mechanical vibration, also maintaining the right distance of the shorting armature from the core. The shorting armature does not depend on the hook's edge for a good contact because the electromagnet always exerts an attracting pull on the shorting armature when it is electrically attracted. Therefore the hook's edge just happens to push only on the armature's tip when attracted but is not responsible for the good contact of the shorting armature. The shorting armature has a very good contact for the passage of current with just the pressure exerted by the magnetic attraction.

As the shorting and cut off armatures in a disturbing station remain tilted they are prevented from falling caused by jerks or jars by the addition of their respective gripping armatures with hooks at their respective tips.

When dial current passes through the disturbing party line coil, the disturbance causes the combination of these cut off armatures equally spaced from the core to be attracted. The pressing armature releases its pressure on the contact points causing its upper combination armature easily to be attracted at the same time and automatically cutting off the circuit from the line.

The armatures' combination makes a good magnetic path for the outside magnetic flux of the core.

From my experiment the shorting armature is about $\frac{3}{32}$ inches away from the core while that of the cut off armature is farther from the core by around $\frac{1}{32}$ to $\frac{1}{16}$ inches.

Having thus fully described my invention what I claim as new and desire to secure by Letters Patent is:

1. In a dial telephone set comprising common talking and dialing circuits and adapted for use with a party line extending to a common battery dial central office, movable switchhook means having operative and inoperative positions, an electromagnet interposed in the common talking and dialing circuit arranged to be energized from the party line upon moving the switchhook means to its operative position, a first armature attractable by the electromagnet in response to at least a minimum degree of energization thereof obtainable only when the party line is otherwise idle, contacts actuated by the first armature arranged to exclude the electromagnet from the common talking and dialing circuit after attraction of the first armature thereby, latch means disposed to hold the contacts actuated and thereby maintain the electromagnet excluded from the common talking and dialing circuit, a second armature attractable by the electromagnet only in response to dial pulses which would tend to cause undesired attraction of the first armature when the party line is busy, a further pair of contacts serially included in the common talking and dialing circuit and normally latched closed by the second armature, and latch restoring means responsive to movement of the switchhook means to its inoperative position arranged to cause reinterposition of the electromagnet into the common talking and dialing circuit and reclosure of the further pair of contacts.

2. A telephone set as in claim 1 further comprising a third armature attractable by the electromagnet only in response to at least the minimum degree of energization, the third armature being arranged, except when attracted, to interfere with movement of the first armature.

3. In a telephone set comprising a talking circuit and adapted for use with a party line extending to a common battery central office, movable switch hook means having operative and inoperative positions, an electromagnet interposed in the talking circuit of the telephone set arranged to be energized from the party line upon moving the switch hook means to its operative position, an armature attractable by the electromagnet in response to at least a minimum degree of energization thereof obtainable only when the party line is otherwise idle, contacts actuated by the armature arranged to exclude the electromagnet from the talking circuit after attraction of the armature thereby, latch means disposed to hold the contacts actuated and thereby maintaining the electromagnet excluded from the talking circuit, and a further armature attractable by the electromagnet only in response to at least the minimum degree of energization, the further armature being arranged, except when attracted, to interfere with movement of the first-named armature.

4. In a party line telephone circuit having an impulse sending dial, a receiver, and a transmitter, the combination which comprises a solenoid positioned in the said circuit, a shorting armature positioned to be influenced by the solenoid, a locking armature for holding the shorting armature and also positioned to be influenced by the solenoid, a switch in the telephone circuit coacting with the shorting armature for by-passing the solenoid after the locking armature has been actuated thereby, and resilient means for returning the locking armature to the position of retaining the shorting armature in the position of holding the switch closed.

5. In a party line telephone circuit having an impulse sending dial, a receiver, and a transmitter, the combination which comprises a solenoid positioned in the said circuit, a shorting armature positioned to be influenced by the solenoid, a locking armature for holding the shorting armature and also positioned to be influenced by the solenoid, a switch in the telephone circuit coacting with the shorting armature for by-passing the solenoid after the locking armature has been actuated thereby, resilient means for returning the locking armature to the position of retaining the shorting armature in the position of holding the switch closed, a cut-off armature also positioned to be influenced by the solenoid and on which one terminal of an auxiliary switch is carried, a pressing armature also positioned to be influenced by the solenoid and having a latch for retaining the cut-off armature in the position of holding the switch terminal in a position of closing a circuit of a party line, means connecting the cut-off and shorting armatures to the receiver of the telephone circuit, and means resiliently holding the pressing armature away from the pull of the solenoid and with the switch terminal of the cut-off armature in the position of closing the circuit.

6. In a party line disturbance eliminator for telephone circuits, the combination which comprises a solenoid, a shorting armature pivotally mounted adjacent the solenoid with one arm positioned to be influenced by the solenoid, a locking armature pivotally mounted adjacent the solenoid also having an arm positioned to be influenced by the solenoid and having a latch carried by the opposite end and positioned to hold the shorting armature, a cut-off armature pivotally mounted adjacent the solenoid and having an arm positioned to be influenced by the solenoid, a pressing armature also pivotally mounted adjacent the solenoid and having an arm extended for being influenced by the solenoid and another arm for retaining an arm of the cut-off armature, switches coacting with the shorting and cut-off armatures, resilient means urging the locking and pressing armatures away from the pull of the solenoid, and means connecting the shorting and cut-off armatures to the receiver of a telephone circuit.

BERNARDO P. DEL ROSARIO.

REFERENCES CITED

The following references are of record in the file of this patent:

UNITED STATES PATENTS

| Number | Name | Date |
|---|---|---|
| 806,950 | Bruce | Dec. 12, 1905 |
| 1,054,176 | Corwin | Feb. 25, 1913 |
| 1,075,200 | Johnson | Oct. 7, 1913 |
| 1,147,223 | Erickson | July 20, 1915 |
| 2,186,242 | Halligan | Jan. 9, 1940 |